United States Patent Office 3,380,816
Patented Apr. 30, 1968

3,380,816
MANUFACTURE OF VULCANIZED LIQUID RESIN BONDED ABRASIVE ARTICLES
De Witt Bell, Fair Lawn, N.J., assignor to Raybestos-Manhattan, Inc., Passaic, N.J., a corporation of New Jersey
No Drawing. Filed Mar. 12, 1965, Ser. No. 439,468
4 Claims. (Cl. 51—298)

ABSTRACT OF THE DISCLOSURE

A hard abrasive article such as grinding and cutting-off wheels which have substantially the cutting action of hard-rubber bonded wheels, but which are superior thereto in that they possess (a) a much lower sensitivity to heat, (b) longer life and greater cutting efficiency, and (c) much higher strength at elevated temperatures resulting in greater safety in operation, which comprises abrasive grains bonded by a vulcanized liquid resin selected from the group consisting of an hydroxy-terminated polymer of butadiene, an hydroxy-terminated copolymer of butadiene and styrene, an hydroxy-terminated copolymer of butadiene and acrylonitrile, and mixtures of said polymer and copolymers, vulcanized with a vulcanizing agent in an amount in the range of 40 to 60 parts per hundred parts of the liquid resin.

---

This invention relates to vulcanized liquid resin bonded abrasive articles and the method of making the same.

Among the several bonds that have been used for bonding abrasive grains in the making of abrasive articles such as grinding wheels, rubber, both natural and synthetic, as the abrasive bond, has been preferred because rubber bonded grinding wheels display some degree of resilience, and give a smoother cutting action and a better finish to the abraded product. Hard rubber bonded wheels have had one disadvantage, however, in that at elevated temperatures the rubber bond softens, resulting in poor adhesion to the abrasive grain, weakening and shortening the life of the abrasive wheel.

The prime object of my present invention is to provide abrasive articles such as grinding and cutting-off wheels which have substantially the cutting action of hard-rubber bonded wheels, but which are superior thereto in that they possess (a) a much lower sensitivity to heat, (b) longer life and greater cutting efficiency, and (c) much higher strength at elevated temperatures resulting in greater safety in operation.

I have found that such improved abrasive wheels are made using as the bond for the abrasive grains a liquid resin comprising certain hydroxy-terminated liquid polymers and co-polymers of butadiene, combined with vulcanizing agents, and heat cured. I have found when certain hydroxy-terminated liquid polymers and copolymers of butadiene are mixed with vulcanizing agents such as sulphur, metallic oxides and with accelerators, mixed with fillers and abrasive grains, and the mix then shaped and heat-cured, that abrasive wheels are produced having substantially the cutting action of hard-rubber bonded wheels modified, however, by all the added advantages referred to above.

I have also found that these hydroxy-terminated liquid polymers and copolymers are compatible with natural rubber, liquified (depolymerized) rubber and synthetic rubbers, and may be mixed or blended therewith to make the abrasive bond, and that the heat resistance of the vulcanized hard bond is improved over hard rubber bonds in proportion to the amount of the polymer or copolymer used in the mix.

The liquid resin which I employ as the bond is an hydroxy-terminated liquid homo-polymer of butadiene, a copolymer thereof (about 75%) and styrene (about 25%), and a copolymer of the homo-polymer (about 85%) and acrylonitrile (about 15%), the said homo-polymer being respresented by the following formula:

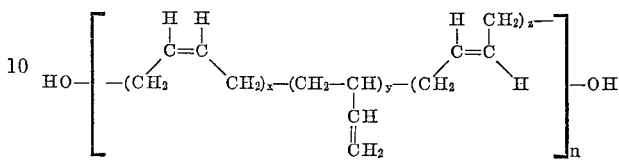

where $x=0.2$ cis, $y=0.2$ vinyl, $z=0.6$ trans, and $n=40$ or 55.

The term "hydroxy-terminated" will be understood to mean that the molecular units are terminated on each end by hydroxy groups which are allylic, primary hydroxy groups.

Typical physical properties of the said homo-polymer of butadiene are as follows:

Average molecular weight _____ 3200
Specific gravity 60°/60° F. _____ 0.904
Brookfield viscosity (30° C., poise) _____ 200–250
Average hydroxyl groups per molecule _____ 2
Hydroxyl content, equivalents per 100 gms. __ 0.07
Hydroxyl equivalent weight _____ 1600

These hydroxy-terminated liquid polymers and copolymers have been made available in a range of viscosities and molecular weights, and are marketed as Poly B–D liquid resins (by Sinclair Petrochemicals, Inc.). The homo-polymer referred to is designated as Poly B–D R–15, the aforesaid copolymer thereof with styrene is designated as Poly B–D ST–15, and the aforesaid copolymer thereof with acrylonitrile is Poly BDAN–15.

For conversion of these polymers and copolymers to the hard heat-resistant bond form, I have found that vulcanization with sulphur is necessary. For the described liquid homo-polyester resin I employ from 50 to 60 parts of sulphur per hundred parts of the liquid resin; and for the copolymers I employ a lesser proportion of sulphur. Many accelerator combinations may be used. I find that a combination of slaked lime and an aldehyde-amine type of accelerator (sold as Grasselerator 808) has proven effective. Inclusion of mineral fillers may also be used, these serving the well known purpose of enhancing the hardness and heat resistance of the abrasive product.

Various abrasives may be employed in the preparation of the arbrasive wheels, such as fused aluminum ($Al_2O_3$), silicon carbide, etc.

The following examples will more fully illustrate the embodiments of the present invention. In these examples all parts given are parts by weight.

EXAMPLE I

The following example illustrates the preparation of an abrasive wheel of the invention using, in this instance, an hydroxyl-terminated liquid homo-polymer of butadiene, and the testing thereof demonstrating its superior hardness and strength at elevated temperatures.

Parts
No. 14 fused alumina abrasive _____ 400
No. 16 fused alumina abrasive _____ 400
No. 20 fused alumina abrasive _____ 400
Hydroxy-terminated homo-polymer of butadiene (Poly B–D R–15) having a viscosity of 220 poises at 30° C. _____ 100 were placed in a Hobart dough mixer and the mixing started. The following ingredients were then added:

| | Parts |
|---|---|
| Sulphur (Spider brand) | 60 |
| Slaked lime | 10 |
| An aldehyde-amine accelerator (Grasselerator 808) | 1 |
| A pigment type clay | 75 |
| Fused alumina abrasive (DCF): dust collector fines | 175 |

Mixing was then continued for ten minutes. Wheels were then formed in a tapered mold 6″ diameter by ⅞″ high. The mold was placed in a hydraulically operated steam press, using 1″ high spacers, and the wheels cured for one-half hour at 300° F. followed by nineteen hours at 330° F. After cooling and removing from the mold, the resulting abrasive wheels were drilled and faced.

Two of these six inch wheels were then compared with two six inch wheels made the same way but using as the bond a liquified rubber known as depolymerized rubber, the making of such latter wheels being described in the patent to Kuzmick and Lange No. 1,990,737, patented Feb. 12, 1935, with the following results:

At room temperature the rubber wheels and the poly butadiene (PBD) wheels all had a clear, high pitched ring when struck with a hammer. At 275° F. the rubber wheels had lost practically all ring when struck with a hammer while the PBD wheels still retained a good high-pitched ring, indicating its retention of hardness at high temperatures.

These two PBD wheels, and the two similar depolymerized rubber wheels were heated in an oven at 250° F. for 1½ hours and then tested immediately for strength on a standard speed testing machine with the following results.

| | |
|---|---|
| Rubber wheel No. 1 | Broken at 5300 r.p.m. |
| Rubber wheel No. 2 | Broken at 5700 r.p.m. |
| PBD wheel No. 1 | Not broken at 11,000 r.p.m. |
| PBD wheel No. 2 | Broken at 11,000 r.p.m. |

These bursting speeds indicate a tensile strength 4 times higher for the PBD wheels, at this temperature.

EXAMPLE II

The following example further illustrates the preparation of abrasive wheels of the invention and the testing thereof illustrating its aforesaid superior cutting efficiency.

The following ingredients were used, employing the same procedure as in Example I:

| | Parts |
|---|---|
| No. 14 fused alumina abrasive ($Al_2O_3$) | 450 |
| No. 16 fused alumina abrasive ($Al_2O_3$) | 500 |
| No. 20 fused alumina abrasive ($Al_2O_3$) | 450 |
| Hydroxy-terminated homo-polymer of butadiene (Poly B–D R–15) (viscosity 370 at 30° C.) | 100 |
| Sulphur (Spider) | 60 |
| Lime (slaked) | 10 |
| Grasselerator 808 | 1 |
| Clay | 75 |
| DCF fires | 200 |

Eight inch by one inch wheels were made by machine molding using cone rollers in an 8″ diameter, 1½″ high mold with a 1″ diameter center pin, and ½″ thick follower plate. The wheels, in the molds were then cold-pressed at 1500 lbs. pressure on a 12″ ram. The molds were then placed in pressure clamps and cured in an oven for 18 hours at 330° F. The wheels were then removed from the molds and sided and faced in the usual way. These wheels also showed excellent retention of pitch—even at temperatures over 300° F. These 8″ wheels were compared with similar wheels made using depolymerized (liquified) natural rubber in a standardized grinding test, in which the wheel at 4100 r.p.m. is held at a constant pressure against a slowly revolving disc of hot-rolled steel for 5 minutes.

| Bond Type | Metal Removed (Grams) | Wheel Wear (Grams) | Metal Removed to Wheel Wear |
|---|---|---|---|
| Depolymerized Natural Rubber Wheel | 1,031 | 445.4 | 2.3 |
| PBD Wheel | 403 | 38.4 | 10.5 |

It will be seen that in 5 min. under these severe conditions the rubber wheel lost almost 1 lb. of weight while the PBD wheel lost only 1⅓ ounces.

Cutting efficiency is sometimes expressed as the ratio $M^2/W$, where M is weight of metal removed per unit time, and W is the weight of wheel lost in the same time. On this basis the efficiency of the PBD wheel is 849 to 478 for the natural rubber wheel.

EXAMPLE III

The following example illustrates the preparation of an abrasive wheel of the invention using, in this case, the composition of Example II with one-half of the hydroxy-terminated liquid homo-polymer of butadiene replaced by the above referred to liquified (depolymerized) natural rubber; and the tests thereof demonstrate their superior hardness and strength at elevated temperatures.

Eight inch by one inch wheels were made as in Example II. These wheels heated to 300° F. in an oven, showed the much better retention of hardness—as shown by "pitch" when hit with a hammer, than ordinary rubber wheels.

These 8″ wheels and other 8″ wheels made using liquified 100% natural rubber as bond were heated to 250° F. in an oven, and then speed tested to destruction as in Example I, with the following results: The 100% natural rubber wheels were broken at an average speed of 3550 r.p.m. while the ones made with a 50% replacement of Poly B–D were broken at an average speed of 6475 r.p.m.

EXAMPLE IV

The following example illustrates the making, and testing for retention of hardness and for bursting strength, of abrasive wheel of the invention using as the bond the liquid hydroxy-terminated copolymer of butadiene and styrene referred to, vulcanized as above described.

Eight inch by one inch wheels were made as in Example II with the same composition except that for the Poly B–D R–15 ingredient, a liquid hydroxy-terminated copolymer of butadiene and styrene (Poly B–D ST–15) was substituted.

These 8″ wheels when heated to 300° F. in an oven showed retention of hardness fully equal or superior to that of the wheels of Example II, and tested for bursting strength as in Example III were broken at an average speed of 8500 r.p.m.

EXAMPLE V

The following example illustrates the making and testing for hardness retention and bursting strength of abrasive wheels of the invention using as the bond the liquid hydroxy-terminated copolymer of butadiene and acrylonitrile previously referred to, vulcanized as above described.

Wheels were made (8″ x 1″) as in Example II, with the same composition exception that a liquid, hydroxy terminated copolymer of butadiene and acrylonitrile (Sinclair's "Poly B–D liquid resin-acrylo-nitrile co-polymer") was substituted for the Poly B–D R–15, and the sulfur ratio was reduced to 40 parts per hundred of polymer. The same advantages of retention of hardness when heated were observed with these wheels. These wheels tested for bursting strength, as in Example III where broken at an average speed of 6200 r.p.m.

The method of making the abrasive wheels of the invention employing the described vulcanized liquid resin as the bond, the abrasive wheels produced thereby and the improved wheel characteristics attained will be fully apparent from the above detailed description thereof.

Such wheels are distinguished, compared to hard-rubber bonded wheels, by their demonstrated much lower sensitivity to heat, longer life, greater cutting efficiency and higher strength at elevated temperatures.

It will be also apparent that many changes may be made in the specific compositions of the wheels, and their manner of production without departing from the spirit of the invention defined in the following claims.

I claim:

1. A hard abrasive article comprising abrasive grains bonded by a vulcanized liquid resin selected from the group consisting of an hydroxy-terminated polymer of butadiene, an hydroxy-terminated copolymer of butadiene and styrene, an hydroxy-terminated copolymer of butadiene and acrylonitrile, and mixtures of said polymer and copolymer vulcanized with sulfur in an amount in the range of 40 to 60 parts per hundred parts of the liquid resin.

2. An abrasive article comprising abrasive grains bonded by a vulcanized liquid resin of claim 1 admixed with a depolymerized natural rubber.

3. The method of making a hard abrasive article comprising mixing abrasive grains with a liquid resin selected from the group consisting of an hydroxy-terminated polymer of butadiene, an hydroxy-terminated copolymer of butadiene and styrene, an hydroxy-terminated copolymer of butadiene and acrylonitrile, and mixtures of said polymer and copolymers, adding sulphur thereto in an amount in the range of 40 to 60 parts per hundred parts of the liquid resin, then shaping and heat curing the mix to abrasive article form.

4. The method of making an abrasive article according to claim 3 in which the liquid resin admixed with a liquified depolymerized natural rubber.

References Cited

UNITED STATES PATENTS

| | | | |
|---|---|---|---|
| 2,822,254 | 2/1958 | Goepfert et al. | 51—298 |
| 3,070,579 | 12/1962 | Szwarc | 51—298 |
| 3,135,716 | 6/1964 | Uraneck et al. | 260—94.7 |
| 3,175,997 | 3/1965 | Hsiek | 260—94.2 M |

DONALD J. ARNOLD, *Primary Examiner.*